US006951345B2

(12) United States Patent
Wilks

(10) Patent No.: US 6,951,345 B2
(45) Date of Patent: Oct. 4, 2005

(54) TRAILER HITCH ALIGNMENT DEVICE

(76) Inventor: David J. Wilks, 4010 Robertsville Ave., Minerva, OH (US) 44657

( * ) Notice: Subject to any disclaimer, the term of this patent is extended or adjusted under 35 U.S.C. 154(b) by 0 days.

(21) Appl. No.: 10/740,106

(22) Filed: Dec. 17, 2003

(65) Prior Publication Data

US 2005/0134020 A1 Jun. 23, 2005

(51) Int. Cl.[7] .................................................. B60D 1/38

(52) U.S. Cl. ................... 280/477; 242/397.5; 254/326; 280/511

(58) Field of Search ................................ 280/477, 480, 280/511; 242/397, 397.5; 254/426, 325, 254/326, 334, 335

(56) References Cited

U.S. PATENT DOCUMENTS

| | | | | | |
|---|---|---|---|---|---|
| 2,736,575 | A * | 2/1956 | Gebhart | ...................... | 280/477 |
| 3,767,230 | A * | 10/1973 | DeVries | ...................... | 280/477 |
| 4,173,353 | A * | 11/1979 | Steele | ........................ | 280/477 |
| 4,186,939 | A * | 2/1980 | Woods et al. | ............... | 280/477 |
| 5,405,160 | A * | 4/1995 | Weaver | ...................... | 280/477 |
| 5,445,487 | A * | 8/1995 | Koscinski, Jr. | ............. | 414/543 |
| 5,752,799 | A * | 5/1998 | Carey et al. | ................ | 414/543 |
| 5,791,858 | A * | 8/1998 | Sasser | ........................ | 414/462 |
| 5,882,029 | A * | 3/1999 | Kennedy | .................... | 280/477 |
| 5,938,227 | A * | 8/1999 | Hills | .......................... | 280/511 |
| 6,086,083 | A | 7/2000 | Wilks | | |
| 6,138,991 | A * | 10/2000 | Myers, Jr. | ................... | 254/323 |
| 6,202,868 | B1 * | 3/2001 | Murray | ....................... | 212/294 |
| 2002/0117831 | A1 * | 8/2002 | Ahlquist et al. | ............ | 280/477 |
| 2004/0108685 | A1 * | 6/2004 | Pierce | ........................ | 280/477 |

* cited by examiner

*Primary Examiner*—Anne Marie Boehler
(74) *Attorney, Agent, or Firm*—Sand & Sebolt

(57) ABSTRACT

A hitch alignment device for aligning a ball and socket of a ball and socket type hitch is disclosed. The alignment device includes a base with a winch and pivotable cable guide mounted on it. The cable guide includes a plate with an arm extending outwardly from it at an angle and an adjustable leg extending outwardly from the arm. A pulley is mounted on the leg and a cable is connected to the winch at one end, is threaded around the pulley and then through holes in the socket and ball of the hitch and is then secured. The cable is wound onto the winch to draw the ball and socket together. The cable guide can be extended and pivoted so that the pulley and therefore the cable is brought into sufficient alignment with the socket on the trailer that undue strain is not placed on the alignment device as the cable is wound onto the winch.

18 Claims, 7 Drawing Sheets

FIG—1

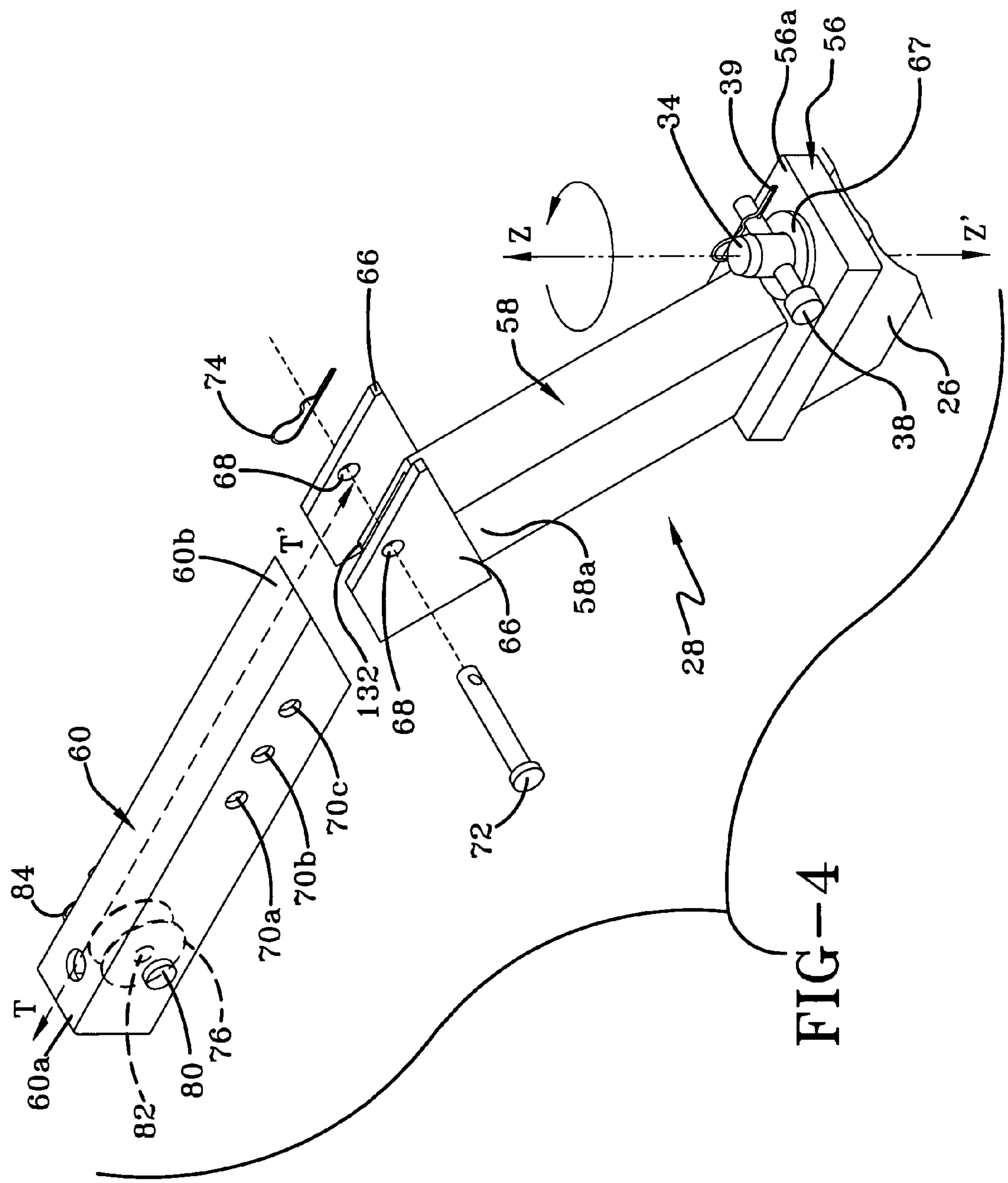
FIG—4

TRAILER HITCH ALIGNMENT DEVICE

BACKGROUND OF THE INVENTION

1. Technical Field

This invention generally relates to trailer hitches for connecting powered vehicles to trailers. More particularly, the invention relates to an alignment device for a ball and socket type trailer hitch. Specifically, the invention relates to an alignment device that is selectively connectable to any suitable support member on a trailer and which includes a pivotable cable guide for aligning a cable with the socket and thereby permit the socket on the trailer to be aligned and drawn toward the ball on the powered vehicle.

2. Background Information

Numerous hitching devices have been proposed in the prior art for connecting powered vehicles and trailers together. One type of hitch is a ball and socket hitch where the ball is mounted on the powered vehicle and the socket is mounted on the trailer. In this type of hitch connection, the socket has to be properly aligned with the ball and when they are so aligned, the socket is slightly raised, then dropped over the ball and secured into place. Ball and socket type hitches can be problematic when the vehicle and trailer are not aligned properly with each other, when the trailer is carrying a heavy load or is parked on uneven terrain or in a location where the powered vehicle is not easy to manoeuver. In these instances, connecting the ball and socket together can prove difficult. Various devices have been proposed in the prior art for overcoming this difficulty. One such device is found in U.S. Pat. No. 6,086,083 granted to the present inventor, Wilks, which patent is commonly assigned with the instant application. The entire specification of the Wilks U.S. Pat. No. 6,086,083 is incorporated herein by reference. In the Wilks patent, a selectively removable trailer hitch alignment device is disclosed. The alignment device may be attached to the tongue of any trailer in an area immediately to the rear of the socket. The alignment device includes a cable and a hand or motor operated winch for winding and unwinding the cable. In order for the device to operate, a hole is provided in both the ball and the socket. The cable is threaded from the winch, through the holes and is fastened off to a cleat on the powered vehicle. Once the cable has been so threaded and fastened off, the winch is engaged. As the cable is wound up, it draws the trailer toward the powered vehicle. While this device functions well, it has shortcomings in that socket on the trailer must still be basically aligned with the ball on the powered vehicle in order for the alignment device to properly draw the cable through the holes in the ball and socket. If the trailer has to be parked at an angle relative to the vehicle or if the vehicle and trailer are at slightly different heights to each other, the winch may not be able to draw the cable through the holes in the ball and socket without damaging the alignment device. Additionally, the alignment device may not be able to be attached to some trailers as the tongue on the trailer may be too short to accommodate the alignment device.

There is therefore still a need in the art for a trailer hitch alignment device that enables the user to align the ball and socket of a hitch together substantially irrespective of the relative position and elevation of the trailer and the powered vehicle.

SUMMARY OF THE INVENTION

The device of the present invention includes a trailer hitch alignment device that is removably mountable on the tongue or any other support member of a trailer. The alignment device includes a pivotable cable guide that can rotate to align the cable with the hole in the socket.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 4 is a partially exploded perspective view of the pivotable arm of the alignment device;

DETAILED DESCRIPTION OF THE INVENTION

Figure 1:
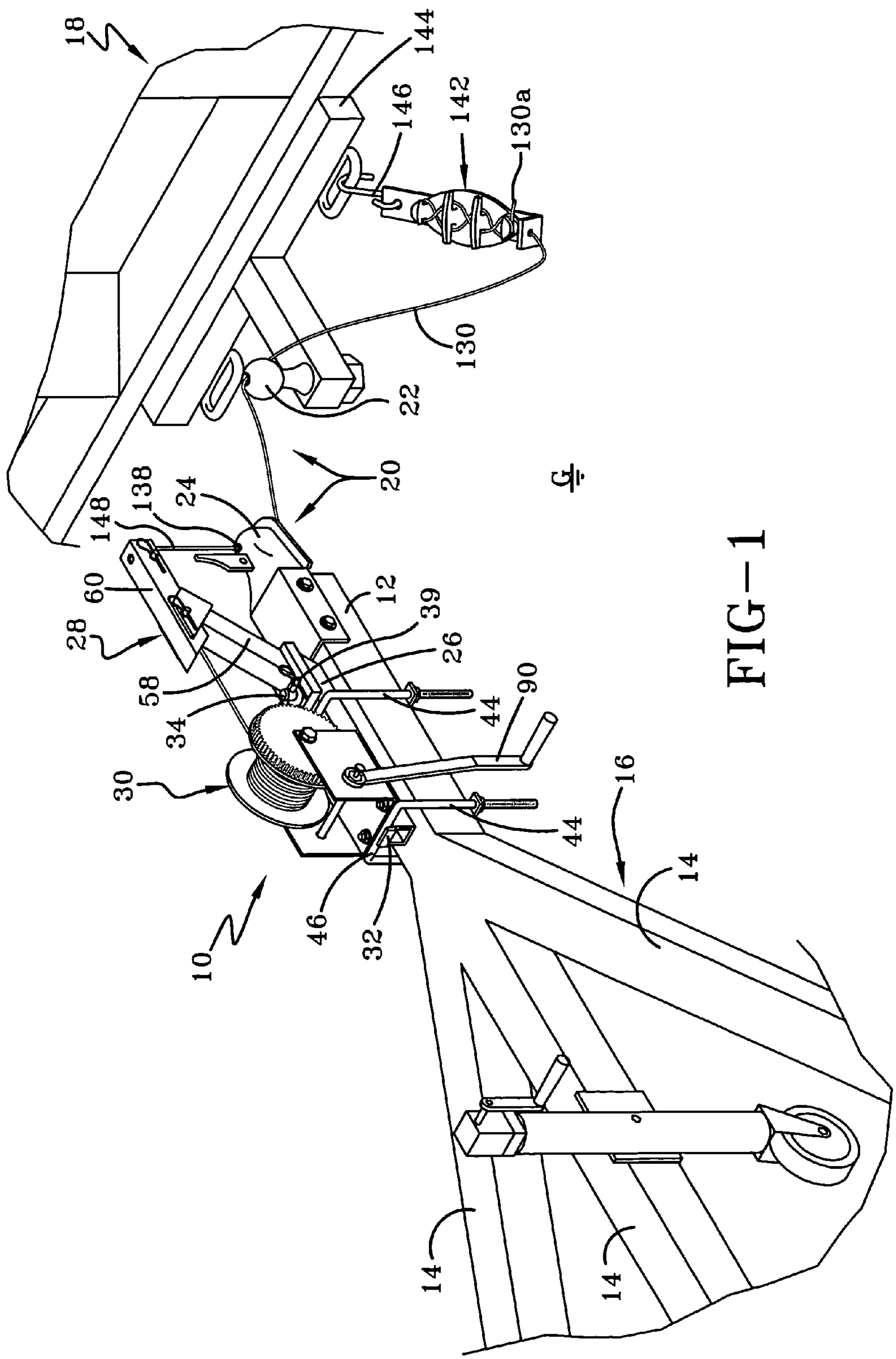
FIG. 1 is a partial perspective view of a trailer and powered vehicle showing the trailer hitch alignment device of the present invention.
Figure 2:
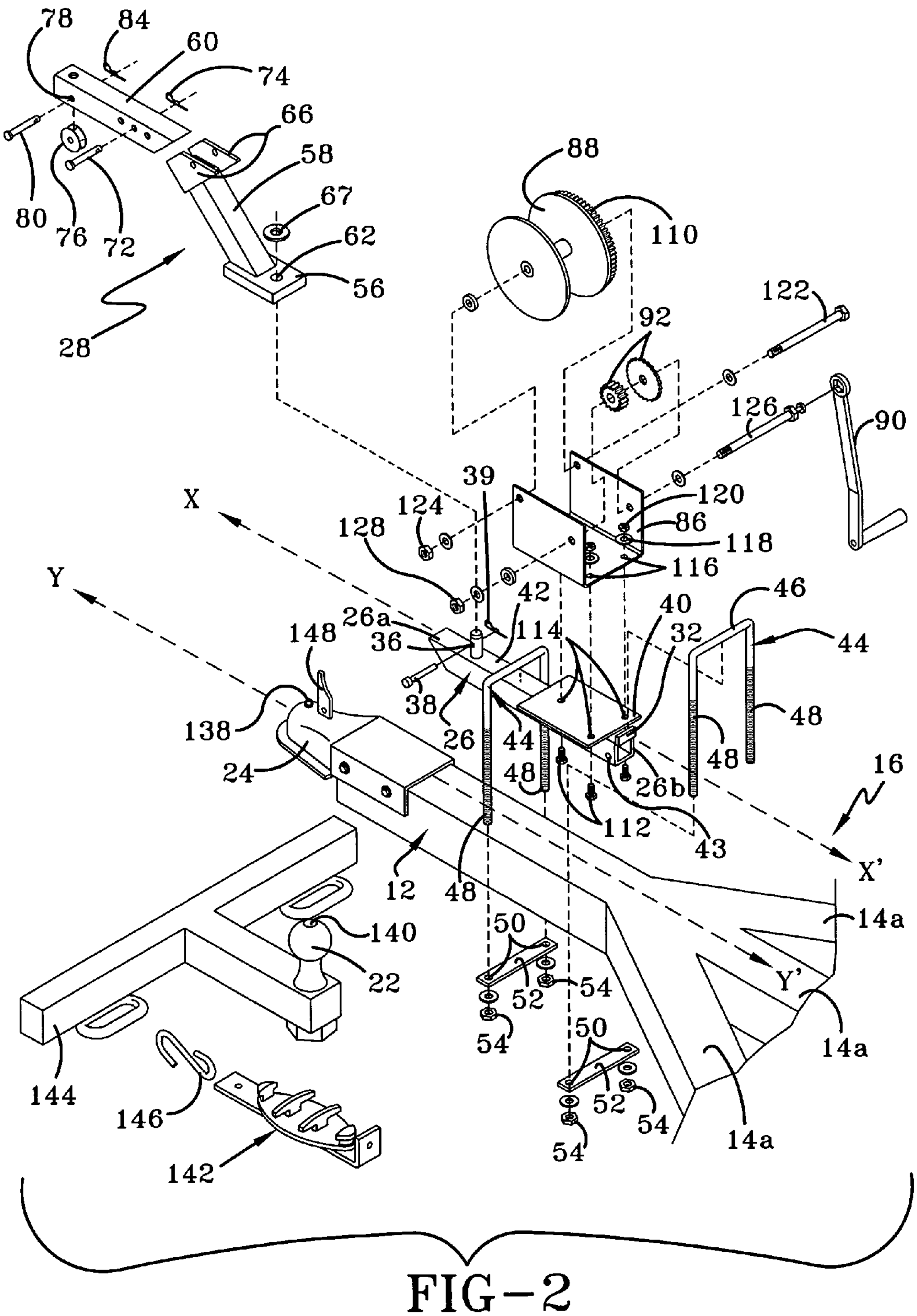
FIG. 2 is an exploded perspective view of the trailer hitch alignment device.
Figure 3:
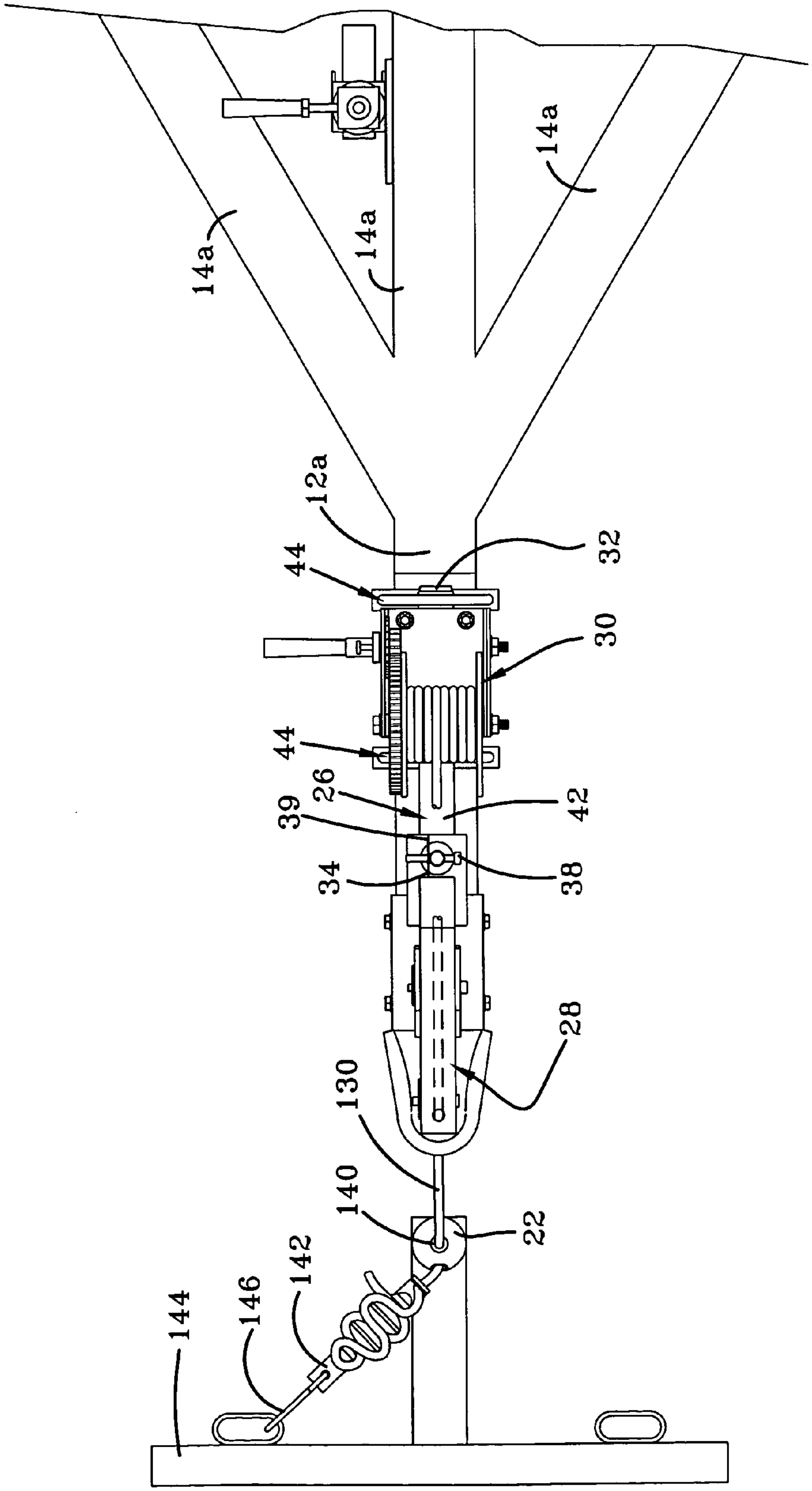
FIG. 3 is a top view of the trailer hitch alignment device attached to the trailer and showing the cable drawing the trailer toward the powered vehicle.

Referring to FIGS. 1–3, there is shown a trailer hitch alignment device, generally referred to by the number 10. Alignment device 10 is adapted to be mounted onto either a tongue 12 or supporting strut 14 of a trailer 16. Trailer 16 is connectable to a powered vehicle 18, such as a car or truck, by a hitch, generally referred to by the number 20, which includes a ball 22 and a socket 24.

The alignment device 10 in accordance with the present invention, has a base 26 which has a pivotable cable guide 28 and a winch 30 mounted on it.

Base 26 is preferably substantially square in cross-section and has a front end 26*a*, a rear end 26*b*, an upper surface 42 and a lower surface 43 and a longitudinal axis X (FIG. 2). A lip 32 extends upwardly and outwardly from rear end 26*b*. A pivot rod 34 extends upwardly from upper surface 42 at a point near the front end 26*a* of base 26. Pivot rod 34 extends normally to the longitudinal axis X of base 26. Rod 34 defines an aperture 36 therethrough, the aperture 36 being sized to receive a lock pin 38 therethrough. A cotter pin 39 secures lock pin 38 in place. A winch mounting plate 40 (FIG. 2) is welded or otherwise secured to the upper surface 42 of base 26 proximate the rear end 26*b*. Base 26 is removably securable to either the tongue 12 or any of the supporting struts 14 of trailer 16. When base 26 is to be positioned on tongue 12 or strut 14, the longitudinal axis X of base 26 and of the tongue 12 or strut 14 are aligned with each other. The bottom surface 43 of base 26 is placed on the upper surface 12*a* of tongue 12 or on the upper surface 14*a* of strut 14. Base 26 is secured to tongue 12 or strut 14 by way of one, and preferably two, U-shaped clamps 44. Clamps 44 each include a bar 46 that rests on the upper surface 42 of base 26 and two threaded legs 48 that extend outwardly from bar 46. Threaded legs 48 are insertable through holes 50 in a lock plate 52 which is adapted to engage the underside (not shown) of tongue 12 or strut 14. A nut 54 is threaded onto each leg 48 to secure lock plate 52 in place and thereby clamp the tongue 12 or strut 14 between the bar 46 and lock plate 52. The clamp 44 that is utilized toward the rear end 26*b* of base 26 may be positioned in front of lip 32 on the upper surface 42 of base 26.

Figure 4A:
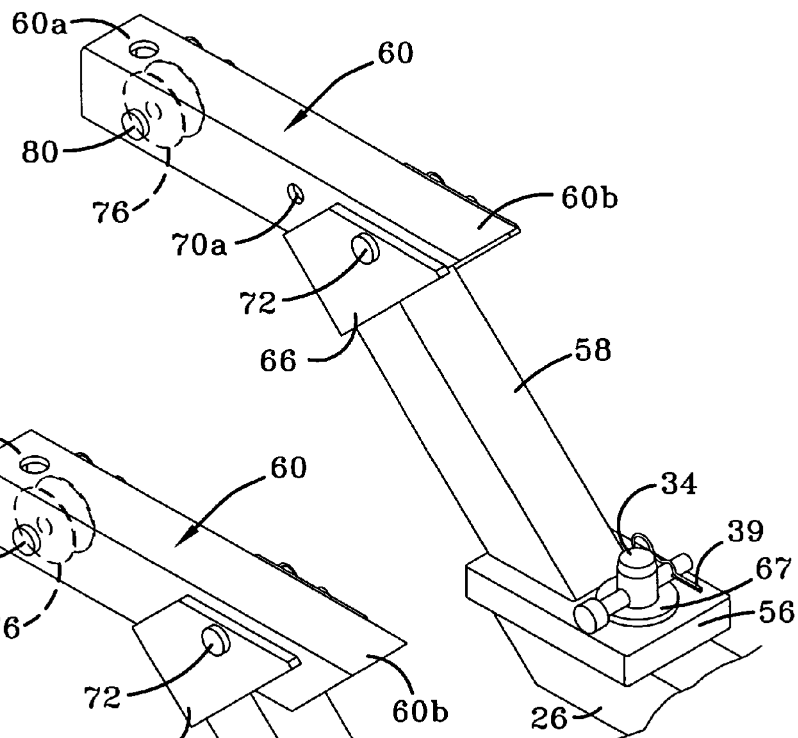
FIG. 4*a* is a perspective view of the pivotable arm, showing the arm extension connected in a first position.
Figure 4B:
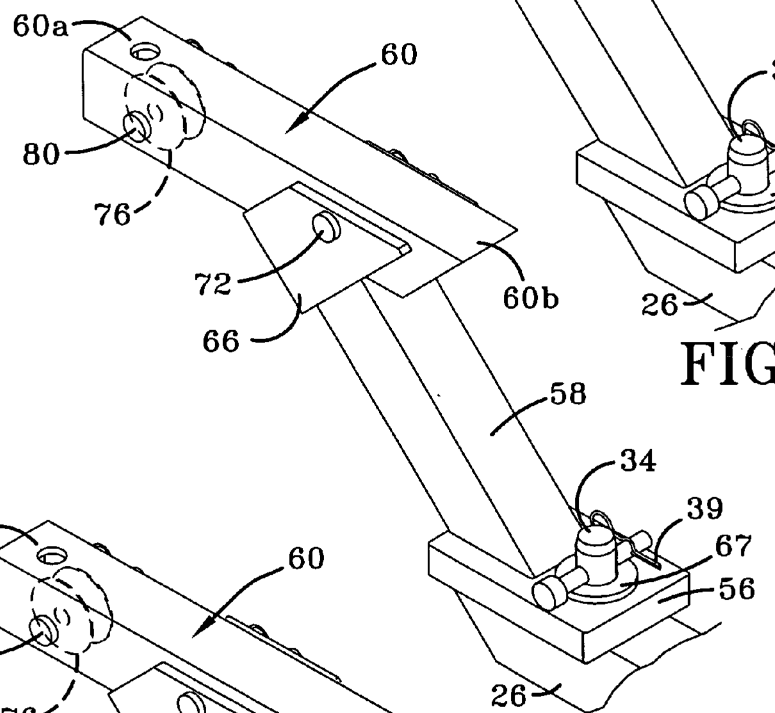
FIG. 4*b* is a perspective view of the pivotable arm, showing the arm extension connected in a second position.
Figure 4C:
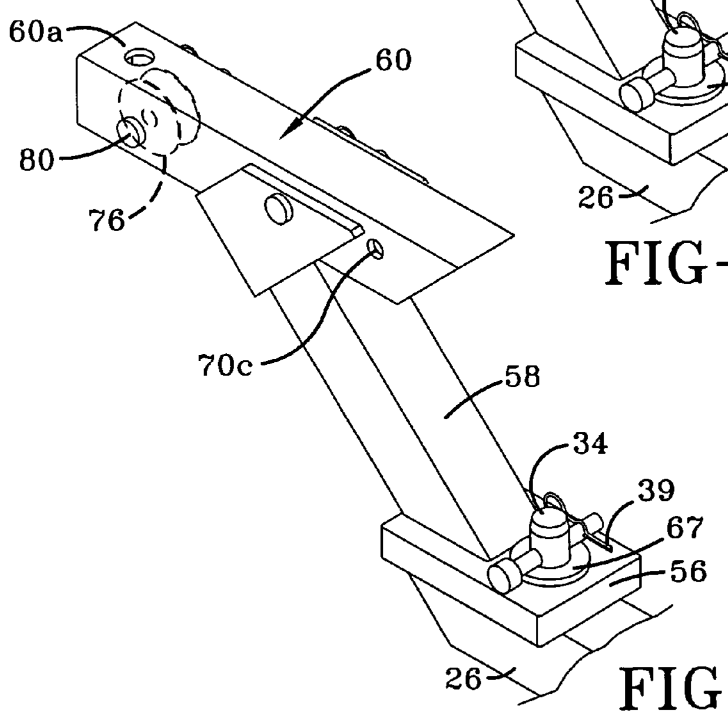
FIG. 4*c* is a perspective view of the pivotable arm, showing the arm extension connected in a third position.
Figure 5:
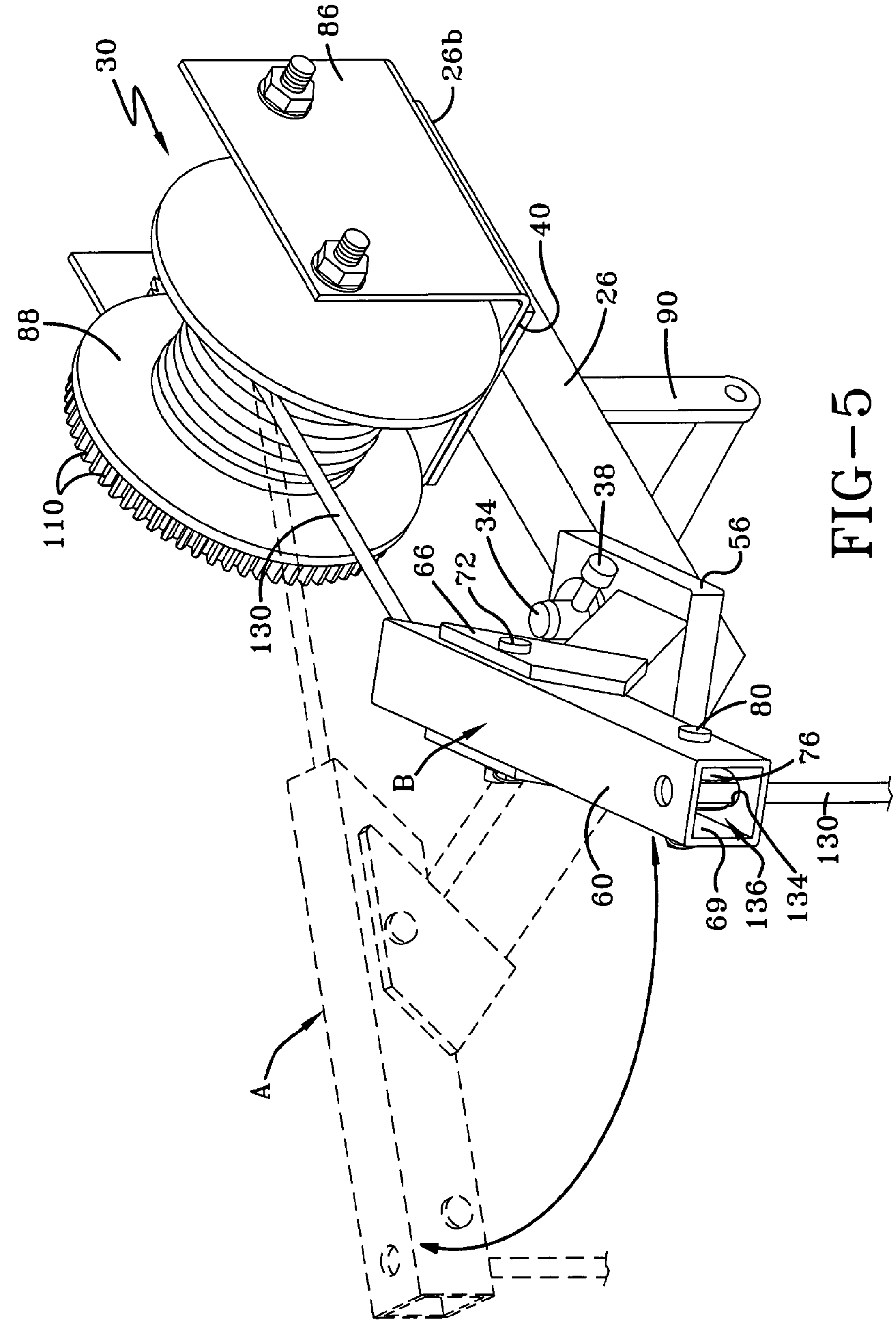
FIG. 5 is a partial perspective view of the trailer hitch alignment device showing the arm pivoting from a first orientation to a second orientation.
Figure 6:
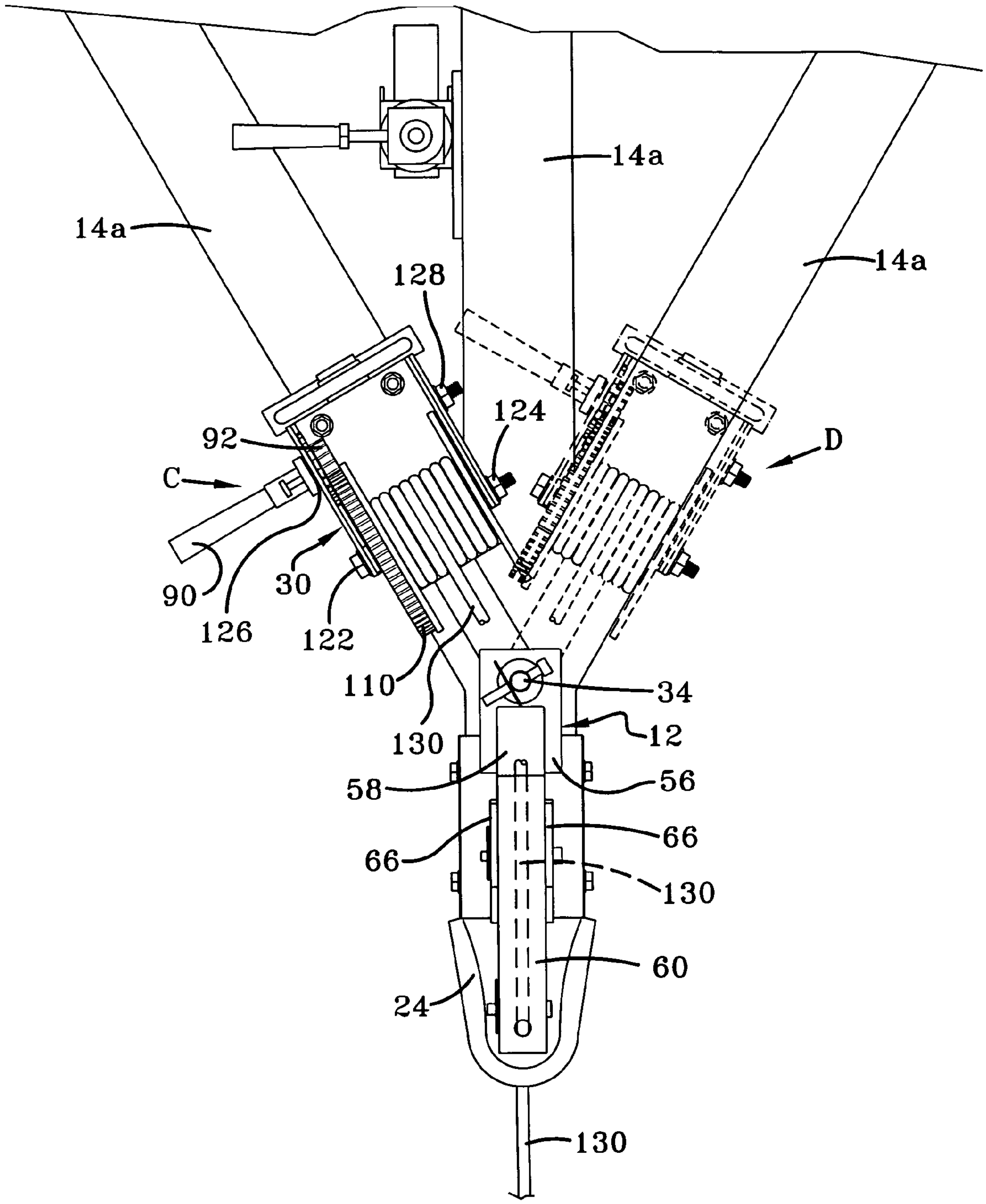
FIG. 6 is a top view of the trailer hitch alignment device mounted on a trailer and showing alternative positions for mounting the alignment device on the trailer and orienting the pivotable arm to secure a cable to the socket and ball.

Referring to FIGS. 4–6, pivotable cable guide 28 is mounted onto base 26. Pivotable cable guide 28 includes a plate 56, an arm 58 that extends upwardly from plate 56 at an angle and a selectively extendable leg 60 that is connected to the upper end 58*a* of arm 58. Arm 58 preferably extends outwardly from the plate 56 at an angle, the angle ranging from about 40° to 60° and preferably at 45°. Leg 60 extends outwardly from the upper end 58*a* of arm 58 and is disposed at an angle to arm 58, the angle ranging from about 130° to 160° degrees and preferably at an angle of 135°. Plate 56 may be rectangular in shape and is preferably welded to arm 58. Plate 56 defines an aperture 62 (FIG. 2) through which pivot rod 34 is receivable. When pivot rod 34 is inserted through aperture 62, a washer 67 may be placed on the upper surface 56*a* of plate 56 and then the lock pin 38 is inserted through aperture 36. A cotter pin 39 engages lock pin 38 to secure plate 56 and base 26 together. When these two components are so secured, pivotable cable guide 28 is able to rotate about an axis of rotation Z–Z' as shown in FIG. 4.

Referring still to FIGS. 4–6, leg 60 is connected to arm 58 via a pair of flanges 66 disposed at the upper end 58*a* of arm 58. Flanges 66 may be generally triangular in shape and may be fixedly mounted, such as by welding, onto arm 58, or, alternatively, flanges 66 may be integrally formed with arm 58. Flanges 66 each define a hole 68 therein and the two holes 68 in the two flanges 66 are preferably axially aligned with each other. Leg 60 may include a channel 69 (FIG. 5) that is either square or U-shaped in cross section. Leg 60 also includes a series of pairs of apertures 70*a*, 70*b* and 70*c*, toward the rear end 60*b* of leg 6*b*. Apertures 70*a*, 70*b*, 70*c* are selectively alignable with the holes 68 in flanges 66. When a particular pair of apertures such as 70*a* is aligned with the holes 68 in flanges 66, a connector pin 72 may be inserted therethrough and then locked into place with a cotter pin 74. A pulley 76 is mounted toward the front end 60*a* of leg 60. Pulley 76 is preferably disposed within channel 69 of leg 60. Leg 60 defines a pair of holes 78 (FIG. 2) proximate the front end 60*a* of leg 60 and a pin 80 passes through holes 78 and an aperture 82 in pulley 76. A cotter pin 84 is used to lock shaft 80 into place.

Referring to FIGS. 2, 5 & 6 a winch 30 is mounted proximate the rear end 26*b* of base 26. Winch 30 includes a bracket 86, a toothed spindle 88, a crank handle 90 and a plurality of gears 92 that engage the teeth 110 on spindle 88. Bracket 86 is secured to mounting plate 40 by way of bolts 112 that are inserted through aligned holes 114, 116 in mounting plate 40 and bracket 86 respectively. Washers 118 and nuts 120 engage bolts 112 to connect mounting plate 40 and bracket 86 together. A lock bolt 122 and nut 124 secure spindle 88 to bracket 86. The teeth 110 on spindle 88 mesh with the gears 92 as they are rotated by crank handle 90. Crank handle 90 is operationally connected to spindle 88 by way of a bolt 126 and nut 128. While a manual crank handle 90 is shown, it will be understood by those skilled in the art that a motorized gear system can be utilized in this device without departing from the spirit of the present invention. A cable 130 is secured to spindle 88 and is wound on and off the spindle 88 by rotating the crank handle 90 in opposite directions. Cable 130 is carried by cable guide 28. The free end 130*a* (FIG. 1) of cable 130 is threaded through the gap 132 (FIG. 4) between flanges 66, into channel 69 in leg 60, around pulley 76 and then downwardly through an aperture 134 in the bottom wall 136 of leg 60. Cable 130 is then threaded downwardly through the hole 138 in socket 24 toward the ground G (FIG. 1). It will be understood by those skilled in the art, that the hole 138 may be preformed in socket 24 or it may be drilled into socket 24. Furthermore, hole 138 may be preformed or drilled at any angle in socket 24 that enables cable 130 to be threaded from socket 24 to ball 22. Hole 138 is preferably drilled perpendicular to the longitudinal axis Y–Y' (FIG. 2) of tongue 12. Similarly, ball 22 is provided with a hole 140 that may be either preformed or drilled in ball 22 and hole 140 is configured to allow cable 130 to be threaded from socket 24 to ball 22. The orientation of holes 138, 140 relative to each other must allow cable 130 to be drawn freely through them so that trailer 16 can be drawn toward powered vehicle 18. Once cable 130 is threaded through hole 140 in ball 22, the free end 130*a* of cable 130 is then threaded around a cradle 142 (FIG. 1) to secure the same and prevent it from being accidentally withdrawn through holes 140 and 138. Cradle 142 is then removably secured to the tow bar 144 or other suitable structure on powered vehicle 18 or trailer 16 by way of a hook 146.

In use, the user first determines whether to connect the alignment device 10 to the tongue 12 or a strut 14 of the trailer 16. If, for example, the alignment device 10 is to be connected to the tongue 12 of the trailer 16, as is shown in FIG. 3, base 26 is placed on the upper surface 12*a* of tongue 12. Clamps 44 are positioned so that the bars 46 of clamps 44 rest against the upper surface 42 and in front of lip 32 of base 26. Lock plate 52 is inserted over threaded legs 48 and nuts 54 are tightened until base 26 is clamped to the tongue 12. If the user determines that the alignment device 10 should be connected to a support strut 14 of trailer 16, then base 26 is placed on the upper surface 14*a* of strut 14 and clamps 44 are similarly used to clamp base 26 to strut 14. The user then pivots pivotable cable guide 28 around until the front end 60*a* of leg 60 lies as close as possible over socket 24. If need be, the user may adjust the length of leg 60 relative to the socket 24 by removing connector pin 72 from the aperture (70*a*, 70*b* or 70*c*) in which it is installed. The length of the leg 60 is then changed by realigning a different pair of apertures (70*a*, 70*b* or 70*c*) to position the pulley 76 as close as possible to directly overhead the hole 138 in socket 24. If, for example, the pulley 76 lies rearwardly of hole 138 in socket 24 and pin 72 is inserted into apertures 70*a*, the user removes pin 72 from apertures 70*a*, slides leg 60 outwardly away from plate 56 until apertures 70*b* or 70*c* align with holes 68 in flanges 66. Pin 72 is then inserted through apertures 70*b* or 70*c* as desired and cotter pin 74 is used to lock pin 72 in place. The user then checks to ensure that pulley 76 lies as close as possible to directly overhead hole 138 as possible. If need be, the user can readjust the length of leg 60 yet again. When pin 72 is inserted through apertures 70*a*, leg 60 is shortest in length and only able to extend a short distance forwardly of front end 26*a* of base 26 when the longitudinal axis X–X' of base 26 and longitudinal axis T–T' (FIG. 4) of leg 60 are aligned. Similarly, when pin 72 is inserted through apertures 70*c*, the leg 60 is longest in length and extends a greater distance forwardly of the front end 26*a* of base 26 when the longitudinal axes X–X' and T–T' respectively of base 26 and leg 60 are aligned. Once the correct position of leg 60 has been determined and leg 60 has been secured to flanges 66, the free end 130*a* of cable 130 is withdrawn from spindle 88, is threaded into channel 69 of leg 60, is wrapped around pulley 76, threaded through hole 134 in bottom wall 136 of leg 60, through hole 138 in socket 24, through hole 140 in ball 22 and then fixed to cradle 142. Cradle 142 is hooked onto tow bar 144. Crank handle 90 is then turned so that the cable 130 is wound up onto spindle 88. Pivotable cable guide 28 rotates as is necessary around its axis of rotation Z–Z' as the cable 130 is wound onto spindle 88. This reduces the strain placed on leg 60 and arm 58 as the cable 130 is shortened in length, especially when the trailer 16 and powered vehicle 18 are not correctly aligned or when the base 26 is secured to a strut 14 on trailer 16. When the ball 22 and socket 24 are aligned and cable 130 is as short as possible, the socket 24 is raised either manually or through the cable movement until it lies on top of ball 22. A locking mechanism 148 is then engaged to secure socket 24 to ball 22.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A hitch alignment device for aligning the components of a ball and socket hitch, where the ball is mounted on a powered vehicle and the socket is mounted on a trailer, the alignment device comprising:

- a base adapted to be connected to a support member on the trailer, the base having an upper and lower surface;
- a pivot rod extending outwardly from and normal to the upper surface of the base;
- a winch mounted on said base;
- a cable guide pivotally mounted on said base; wherein the cable guide comprises:
  - a plate that abuts the upper surface of said base,
  - an arm extending outwardly from the plate, the arm having an upper end,
  - a pair of flanges disposed proximate the upper end of the arm
  - an adjustable leg that extends outwardly from the upper end of the arm and at an angle to the arm; wherein the leg is adjustably connectable to the flanges; and
- a cable having a first end and a second end, wherein the first end is connected to said winch; and said cable is movably carried by said cable guide so that said cable may be wound onto or off of said winch; and wherein the second end of said cable is adapted to be received through an aperture in the socket and subsequently through an aperture in the ball; and wherein said cable guide pivots to align the cable with the aperture in the socket.

2. The hitch alignment device of claim 1, in which the plate defines an aperture sized to receive the pivot rod, and in which the pivot rod extends through the aperture when the plate is in abutting contact with the upper surface of the base.

3. The hitch alignment device of claim 2, further comprising:

- a lock pin; and
- a hole extending through the pivot rod; and the lock pin is received through the hole to secure the cable guide to the base.

4. The hitch alignment device of claim 1, wherein the arm extends outwardly at an angle to the plate.

5. The hitch alignment device of claim 4, wherein the angle of the arm to the plate is in the range of 40 to 60 degrees.

6. The hitch alignment device of claim 5, wherein the angle of the arm to the plate is 45 degrees.

7. The hitch alignment device of claim 4, wherein the arm is integrally formed with the plate.

8. The hitch alignment device of claim 1, wherein the angle of the leg to the arm is in the range of 130 to 160 degrees.

9. The hitch alignment device of claim 8, wherein the angle of the leg to the arm is 135 degrees.

10. The hitch alignment device of claim 1, wherein the flanges are welded to the upper end of the arm.

11. The hitch alignment device of claim 1, further comprising:

- a connector pin; and wherein each flange defines an axially aligned hole therethrough and wherein the leg has a longitudinal axis and the leg defines at least one first aperture and at least one second aperture along the longitudinal axis; and the at least one first and second apertures are selectively alignable with the holes in the flanges; and the leg is connected to the arm by the connector pin, the connector pin being removably insertable through the aligned holes and one of the at least first and second apertures.

12. The hitch alignment device of claim 11, wherein the leg is disposed at a first position relative to the arm when the holes in the flanges align with the at least one first aperture in the leg and the leg is disposed at a second position when the holes in the flanges align with the at least one second aperture in the leg; and when the leg is disposed in the first position it extends further outwardly from the arm than when the leg is disposed in the second position.

13. The hitch alignment device of claim 12, wherein the leg further includes a pulley mounted a spaced distance from the arm and the cable is threaded around the pulley.

14. The hitch alignment device of claim 13, wherein the leg includes a channel and the pulley is mounted within the channel and the cable is threaded through the channel and around the pulley.

15. The hitch alignment device of claim 1, wherein the base is secured to the support member by at least one U-shaped, threaded clamp and a lock plate.

16. The hitch alignment device of claim 15, wherein the base has a first end and a second end and the second end includes an upwardly extending lip, and the clamp is receivable in front of the lip.

17. The hitch alignment device of claim 1, wherein the alignment device further includes a cable securing device for securing the second end of the cable.

18. The hitch alignment device of claim 17, wherein the cable securing device is adapted to be selectively and removably connectable to the powered vehicle.

* * * * *